(12) United States Patent
Kikuchi et al.

(10) Patent No.: US 7,836,971 B2
(45) Date of Patent: Nov. 23, 2010

(54) POWER TOOL

(75) Inventors: Atsuyuki Kikuchi, Hitachinaka (JP); Tsukasa Suzuura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 16 days.

(21) Appl. No.: 11/763,621

(22) Filed: Jun. 15, 2007

(65) Prior Publication Data

US 2007/0289762 A1 Dec. 20, 2007

(30) Foreign Application Priority Data

Jun. 16, 2006 (JP) ............................ P2006-166902

(51) Int. Cl.
*B25D 17/04* (2006.01)
*B25D 17/24* (2006.01)

(52) U.S. Cl. .................... 173/162.1; 173/162.2; 16/431

(58) Field of Classification Search ............. 173/162.1, 173/162.2; 16/431, 441; 267/136, 137, 140.12, 267/140.2
See application file for complete search history.

(56) References Cited

U.S. PATENT DOCUMENTS

| | | | |
|---|---|---|---|
| 3,322,211 A * | 5/1967 | Alabuzhev et al. ....... | 173/162.2 |
| 3,824,417 A | 7/1974 | Moores, Jr. | |
| 4,323,014 A | 4/1982 | Yamazaki et al. | |
| 4,749,049 A * | 6/1988 | Greppmair ............... | 173/162.2 |
| 4,800,965 A | 1/1989 | Keller | |
| 4,936,394 A * | 6/1990 | Ohtsu ....................... | 173/162.2 |
| 5,025,870 A * | 6/1991 | Gantner ................... | 173/162.2 |
| 5,052,500 A * | 10/1991 | Ohtsu ....................... | 173/162.2 |
| 5,522,466 A | 6/1996 | Harada et al. | |
| 5,697,456 A * | 12/1997 | Radle et al. .............. | 173/162.2 |
| 5,699,865 A * | 12/1997 | Forderer et al. .......... | 173/162.2 |
| 5,871,059 A * | 2/1999 | Shibata et al. ............ | 173/211 |
| 6,421,880 B1 * | 7/2002 | Prajapati et al. ................ | 16/431 |
| 6,766,868 B2 * | 7/2004 | Frauhammer et al. ......... | 173/48 |
| 7,076,838 B2 * | 7/2006 | Meixner ....................... | 16/431 |
| 7,100,706 B2 * | 9/2006 | Meixner et al. .......... | 173/162.2 |
| 7,152,853 B2 * | 12/2006 | Menzel et al. ............... | 267/137 |
| 7,287,601 B2 * | 10/2007 | Hellbach et al. ......... | 173/162.2 |
| 7,320,369 B2 * | 1/2008 | Stirm et al. .............. | 173/162.2 |

(Continued)

FOREIGN PATENT DOCUMENTS

EP 0962240 5/1999

(Continued)

*Primary Examiner*—Rinaldi I. Rada
*Assistant Examiner*—Gloria R. Weeks
(74) *Attorney, Agent, or Firm*—McDermott Will & Emery LLP (57) ABSTRACT

An elastic unit includes a transatory unit including a first elastic support member, a second elastic support member and not-shown four round bar-shaped elastic bodies made of rubber. A rotation urging unit is composed of a Neidhart spring including an outer frame, a shaft, a rotary member, and four rubber rods. The rotary member is in a state where it is rotated at 10° counterclockwise from an initial state. Therefore, the rubber rod deforms upon reception of rolling friction from the outer frame and the rotary member, and the rotation urging unit gives the handle portion the urging power by which the handle portion is rotated so that one end of the handle portion is spaced away from a gear housing 31 in the direction of the handle portion.

7 Claims, 11 Drawing Sheets

U.S. PATENT DOCUMENTS

| | | | |
|---|---|---|---|
| 7,322,428 B2 * | 1/2008 | Bacila | 173/162.2 |
| 2005/0050690 A1 | 3/2005 | Oddo et al. | |

FOREIGN PATENT DOCUMENTS

| | | |
|---|---|---|
| EP | 1510298 | 8/2004 |
| EP | 1541003 | 12/2004 |
| GB | 2137132 | 3/1984 |
| GB | 4124574 A1 | 7/1991 |
| JP | 2005-074573 | 3/2005 |
| WO | 2006022345 A1 | 3/2006 |

* cited by examiner

FIG. 20

POWER TOOL

CROSS-REFERENCE TO RELATED APPLICATIONS

This application is based on and claims the benefit of priority from the prior Japanese Patent Application No. 2006-166902, filed on Jun. 16, 2006; the entire contents of which are incorporated herein by reference.

TECHNICAL FIELD

The present invention relates to a power tool, and particularly to a power tool with a vibration-proof handle.

BACKGROUND

Description of Related Art

Heretofore, a power tool with a vibration-proof handle has been proposed. It is disclosed by, for example JP-A-2005-74573 that a power tool in which an elastic unit is provided between one end of a handle portion and a tool body, and the handle portion is provided rotatably around the other end portion from the tool body side in a direction of the one end. Further, there has been disclosed another power tool in which a handle portion and a tool body coupled to each other are provided, and a power motor and a reciprocation converting part for converting rotational motion of the power motor into reciprocating motion are accommodated in the tool body. To a leading end of the tool body, a tip tool driven by the reciprocating motion of the reciprocation converting part is attached.

The handle portion has one end located on the upside and the other end located on the downside. One end and the other end are connected to a back portion of the tool body respectively. Between one end and the tool body, an elastic unit is provided. At the other end, a shaft is provided, and the handle portion is provided rotatably around the shaft from the tool body side in the direction of the one end. The elastic unit is composed of a first elastic support member, a second elastic support member, and a coil spring. The first elastic support member is fixed to the tool body, and forms a first groove and a second groove communicating with the first groove. The first groove is formed so as to extend in the front and back direction. The second groove is located behind the first groove, has a width narrower than the width of the first groove, and opens backward of the first elastic support member.

The second elastic support member is fixed to one end of the handle portion. The second elastic support member includes a bar portion and a semi-cylindrical portion. The bar portion extends forward from the back portion of the second elastic support member, and penetrates the second groove. The semi-cylindrical portion is provided at the leading end of the bar portion, has the width that is larger than the width of the second groove, and is arranged in the first groove slidably in relation to the first elastic support member. The coil spring is arranged in the first groove, and provided between the first elastic support member and the semi-cylindrical part. One end of the handle portion is urged by the coil spring from the tool body side in the direction of one end.

SUMMARY

The above-described power tool, in case that an initial load of the coil spring, that is, a load applied onto the coil spring in a non-operation state is smaller, can absorb low vibration. Therefore, it is desirable that the initial load of the coil spring is small. However, in case that reduction of the initial load of the coil spring (reduction of free length of the coil spring) is attempted, backlash can be produced by accuracy error thereof. To the contrary, in case that it is attempted to prevent the backlash from being produced, the initial load cannot help being set large. Accordingly, since the initial load of the coil spring is large in the initial state after all, the vibration in the low vibration area of the power tool cannot be absorbed sufficiently, so that workability lowers.

Therefore, the invention has an object to provide a power tool which can reduce an initial load to be applied to an elastic unit in an initial state and absorb vibration in the low vibration area efficiently.

In order to achieve the above object, according to the invention, there is provided a power tool which comprises a housing; a handle having one end connected to a back portion of the housing and the other end connected to a back portion of the housing which is different from the portion to which the one end of the housing is connected; an elastic unit provided between the housing and the one end; and a rotation urging unit which is provided between the housing and the other end, and gives the handle the urging power by which the handle is rotated around the other end so that the one end is spaced away from the housing in a direction of the handle.

The power tool may include a stopper which is provided between the housing and the one end of the handle, and restricts spacing of the one end at a given interval and more away from the housing.

Further, the rotation urging unit may have non-linear characteristics.

Further, the rotation urging unit may be arranged around a center of the rotation of the handle.

Further, the rotation urging unit may include an outer frame which defines inner space, a shaft which passes through the inner space and around which the handle is rotated, a rotary member which is fixed, in the inner space, to the shaft and can rotate together with the shaft, and plural elastic bodies provided in the inner space between the outer frame and the rotary member.

Further, the rotation urging unit may be a Neidhart spring.

Further, the rotation urging unit may give the urging power to the handle by rolling friction of the elastic bodies.

Further, the power tool may include a motor accommodated in the housing, a reciprocation converting part which converts rotation of the motor into reciprocating motion, and a tip tool which is attached to a leading end side of the housing, and drives by the reciprocating motion of the reciprocation converting part; and the reciprocation converting part includes a cylinder, a piston provided at the inner periphery of the cylinder slidably, a motion converting part which converts rotational drive force of the electric motor into reciprocating motion of the piston, and a striker which is driven by the reciprocating motion of the piston.

According to one aspect of the invention, the power tool includes the rotation urging unit which is provided between the housing and the other end, and gives the handle the urging power by which the handle is rotated around the other end so that the one end is spaced away from the housing in the direction of the handle. Since the rotation urging unit is provided at the other end of the handle which is apart from the one end thereof, a very small load can be applied to the one end. Therefore, in an initial state, an initial load to be applied to the elastic unit can be reduced. Accordingly, in case that the power tool generates vibration, the vibration in a low vibration area in the initial operation can be damped effectively, and workability of the power tool can be improved. Further, the elastic unit can be effectively available to damp the vibration between a low vibration area and a high vibration area.

According to a second aspect of the invention, the power tool includes the stopper which is provided between the housing and the one end of the handle and restricts spacing of the one end at a given interval and more away from the housing. Therefore, by the rotation urging unit, spacing of the one end of the handle which receives the urging power at a given interval and more away from the housing can be restricted. Therefore, in a non-operation, the one end of the handle is located at the predetermined position, so that the backlash of the handle portion can be prevented.

According to a third aspect of the invention, the rotation urging unit has the non-linear characteristics. Therefore, spring constant of the rotation urging unit in a non-operation can be reduced. Accordingly, in case that the power tool generates vibration, the vibration in a low vibration area in the initial operation can be damped effectively by the elastic unit, an influence which the urging power of the rotation urging unit has on operational ease of the handle can be reduced, and workability of the power tool can be improved.

According to a fourth aspect of the invention, the rotation urging unit is arranged around a center of the rotation of the handle. Therefore, at one place, giving of the urging power to the handle portion, and the vibration damping of the power tool can be carried out.

According to a fifth aspect and a sixth aspect of the invention, the rotation urging unit includes the outer frame which defines the inner space, the shaft which passes through the inner space and around which the handle is rotated, the rotary member which is fixed, in the inner space, to the shaft and can rotate together with the shaft, and the plural elastic bodies provided in the inner space between the outer frame and the rotary member; and the rotation urging unit is the Neidhart spring. Therefore, fluctuation of the handle portion around a line segment connecting one end of the handle portion and the other end thereof can be restrained.

According to a seventh aspect of the invention, the rotation urging unit gives the urging power to the handle by rolling friction of the elastic bodies. Therefore, since spring constant of the rotation urging unit can be reduced, the vibration in the low vibration area in the initial operation of the power tool can be damped effectively by the rotation urging unit, and workability of the power tool can be improved.

According to an eighth aspect of the invention, the power tool includes the motor accommodated in the housing; the reciprocation converting part which converts rotation of the motor into reciprocating motion; and the tip tool which is attached to a leading end side of the housing, and drives by the reciprocating motion of the reciprocation converting part. Further, the reciprocation converting part includes the cylinder, the piston provided at the inner periphery of the cylinder slidably, the motion converting part which converts rotational drive force of the electric motor into reciprocating motion of the piston, and the striker which is driven by the reciprocating motion of the piston. Therefore, the vibration in the low vibration area generated by the drive of the striker in the initial operation can be damped effectively by the rotation urging unit and the elastic unit, and workability of the power tool can be improved.

DESCRIPTION OF THE EMBODIMENTS

A first embodiment in which the power tool of the invention is applied to a hammer tool will be described with reference to FIGS. 1 to 5. With the left side in FIGS. 1 and 2 as a leading end side of a hammer tool 1 and with the right left therein as a rear end side thereof, the embodiment will be described below. The hammer tool 1 includes a handle portion 10, and a tool body 60 composed of a motor housing 20 and a gear housing 30.

Figure 1:
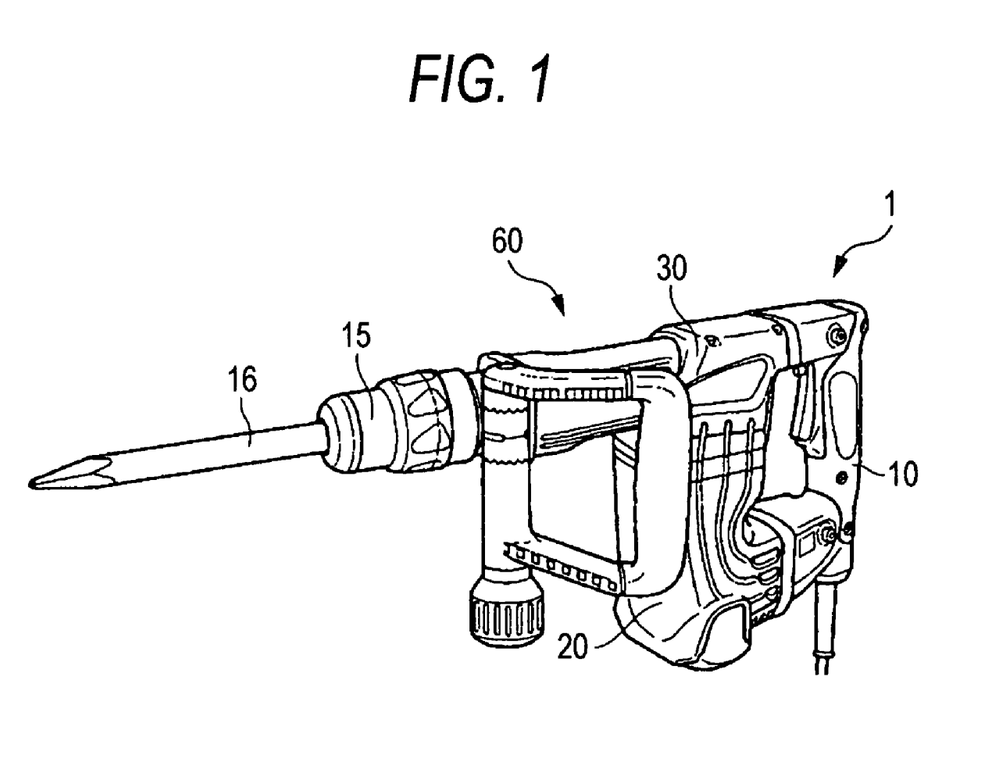
FIG. 1 is an external perspective view of a first embodiment in which a power tool of the invention is applied to a hammer tool.
Figure 2:
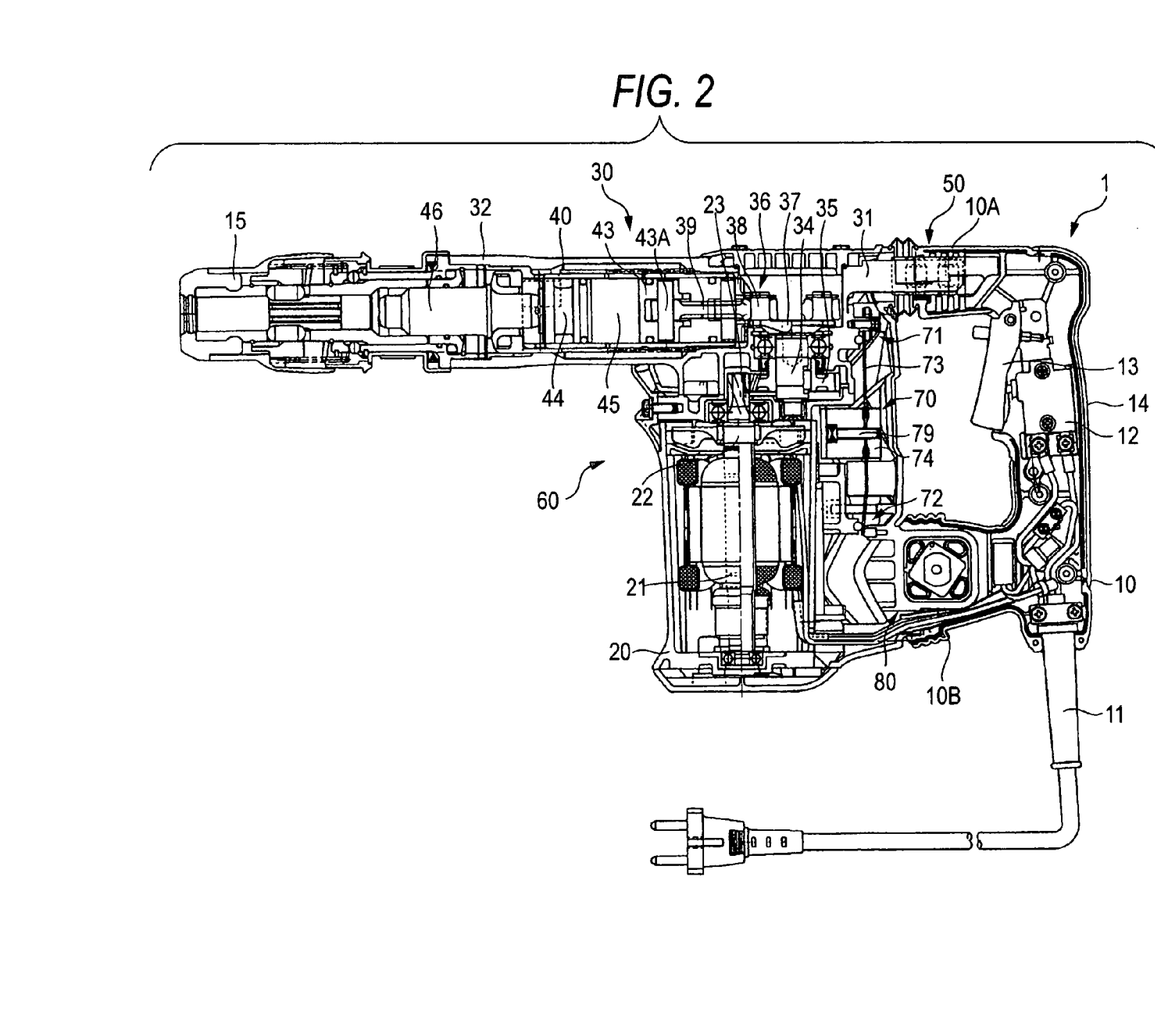
FIG. 2 is a sectional view of the first embodiment in which the power tool of the invention is applied to the hammer tool.

As shown in FIG. 2, to the handle portion 10, a power cable 11 is attached, and a switch mechanism 12 is included in the handle portion 10. To the switch mechanism 12, a trigger 13 which can be operated by a user is mechanically connected. The power cable 11, by connecting the switch mechanism to a not-shown external power source and operating the trigger 13, can switch connection and disconnection between an electric motor 21 described later and the external power source. Further, the handle portion 10 has a grip portion 14 which the user grips when he uses the hammer tool 1.

The handle portion 10 has one end 10A located on the upside and the other end 10B located on the downside. The one end 10A is connected to a back portion of a motion converting housing 31 described later. Between the one end 10A and the motion converting housing 31, an elastic unit 50 is provided. The other end 10B is connected to a back portion of the motor housing 20. Between the other end 10B and the motor housing 20, a rotation urging unit 80 is provided.

The elastic unit 50 and the rotation urging unit 80 will be described with reference to FIGS. 3 to 5. As shown in FIG. 4, the elastic unit 50 is composed of a transatory unit including a first elastic support member 51, a second elastic support member 52, and four round bar-shaped elastic bodies 53 made of rubber. The first elastic support member 51 is fixed to the motion converting housing 31, and forms a first groove 51a in the shape of an ellipse and a second groove 51b communicating with the first groove 51a. The first groove 51a is formed so as to extend in the front and back direction. The second groove 51b is located at the back of the first groove 51a, has a width narrower than the width of the first groove 51a, and opens backward of the first elastic support member 51. Further, on both side walls of the first elastic support member 51, a first inclined surfaces 51c is formed respectively.

The second elastic support member 52 is fixed to the one end 10A of the handle portion 10 through bolts 54. The second elastic support member 52 is provided with a bar portion 52A and a cylindrical portion 52B. The bar portion 52A extends from the back portion of the second elastic support member 52 forward and passes through the second groove 51b. The cylindrical portion 52B is provided at the leading end of the bar portion 52A, has a diameter longer than the width of the second groove 51b, and is retained in the first groove 51a slidably in relation to the first elastic support member 51. Accordingly, the one end 10A can come close to and separate from the motion converting housing 31. Further, the diameter of the cylindrical portion 52B is longer than the width of the second groove 51b, which makes it possible to prevent the cylindrical portion 52B from coming out from the first groove 51a and the second groove 51b, and makes it possible to restrict spacing of the handle portion 10 at a given interval and more away from the housing 31.

Further, on the inner wall of the second elastic support member 52, second inclined surfaces 52C are formed, which extend in parallel with the first inclined surfaces 51C and are spaced from the first inclined surfaces 51C at a given interval. The four elastic bodies 53 are provided between the first inclined surfaces 51C and the second inclined surfaces 52C. Therefore, the handle portion 10 and the motion converting housing 31 are connected through the four elastic bodies 53. Further, the elastic body 53, by the movement of the second elastic support 52 to the first elastic support member 51 side, receives rolling friction between the second inclined surface 52C and the first inclined surface 51C. Therefore, the elastic unit 50 exhibits non-linear characteristics.

Figure 3:
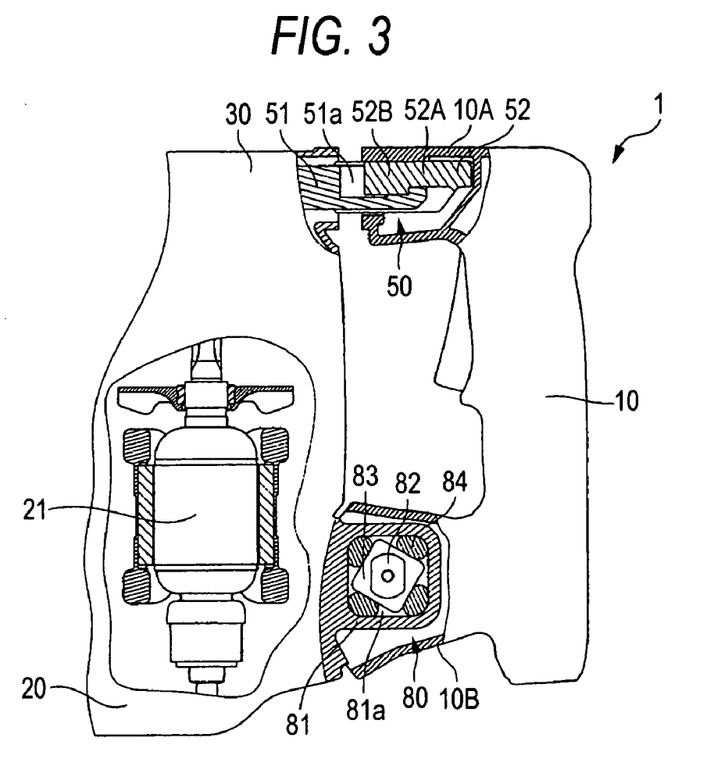
FIG. 3 is a partially sectional view of a back side of a tool body and a handle portion in a non-operation state of the hammer tool shown in FIG. 2.
Figure 4:
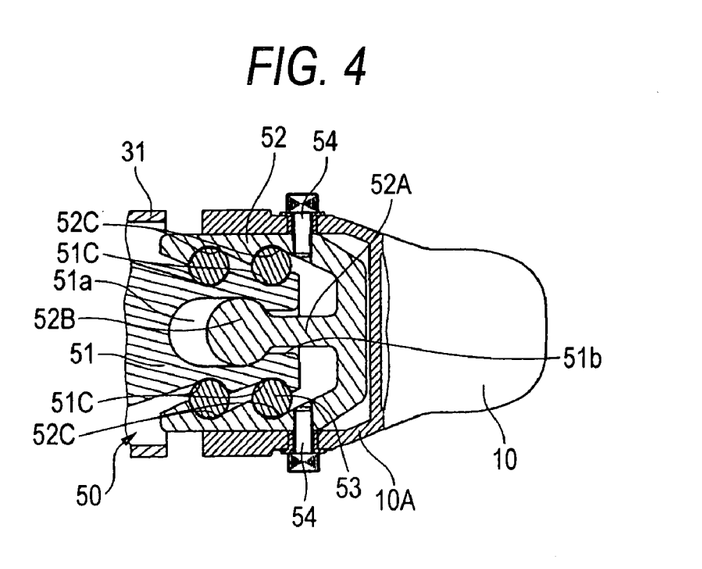
FIG. 4 is a sectional view of an elastic unit shown in FIG. 3.
Figure 5:
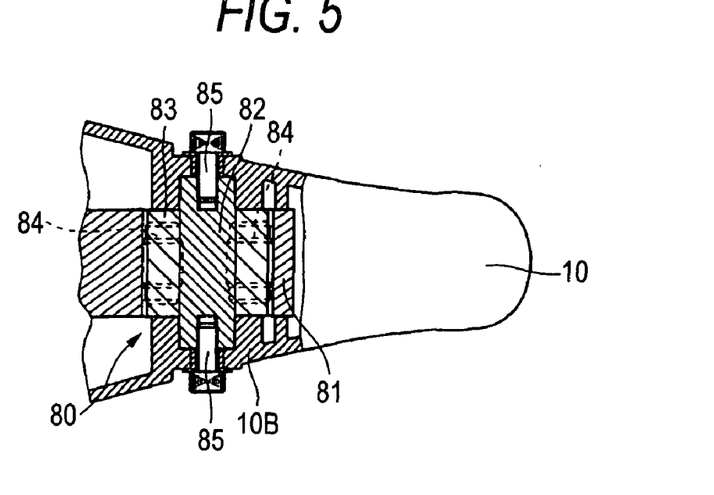
FIG. 5 is a sectional view of a rotation urging unit shown in FIG. 3.

As shown in FIGS. 3 and 5, the rotation urging unit 80 is composed of a Neidhart spring including an outer frame 81, a shaft 82, a rotary member 83 which is nearly square in section, and four rubber rods 84. The outer frame 81 defines an inner space 81a which is nearly square in section, and is fixed to the motor housing 20. The shaft 82 passes through the inner space 81a, and is fixed to the other end 10B of the handle portion 10 through bolts 85. The handle portion 10 is provided rotatably around the shaft 82. The rotary member 83 is fixed, in the inner space 81a, to the shaft 82, and provided rotatably together with the shaft 82. Accordingly, by rotating the handle portion 10, the shaft 82 rotates and the rotary member also rotates. Further, the four rubber rods 84 are provided, in the inner space 81a, between the outer frame 81 and the rotary member 83.

Figure 6:
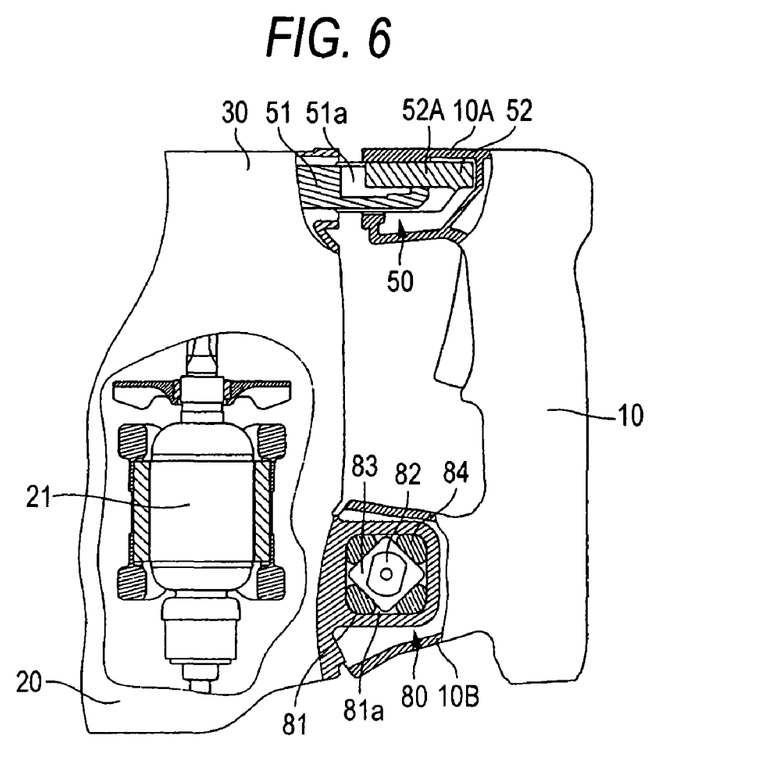
FIG. 6 is a diagram showing a state where a rotary member in the first embodiment in which the power tool of the invention is applied to the hammer tool is inclined at 45° to inner space of an outer frame (initial state)

FIG. 6 shows a state where a portion corresponding to the cylindrical portion 52B shown in FIGS. 3 and 4 has the same width as the width of the bar portion 52A (the width narrower than the width of the second groove 51b). Therefore, the portion corresponding to the cylindrical portion 52B does not restrict spacing of the handle portion 10 at a given interval and more away from the motion converting housing 31. At this time, the rotary member 83 having the nearly square section of the rotation urging means 80 is in a state inclined at 45° to the inner space 81a having the nearly square section, of the outer frame 81 (initial state). To the contrary, the rotary member 83 in FIG. 3 is in a state where it is rotated counterclockwise at 10° from the initial state. Accordingly, the rubber rod 84 receives the rolling friction between the outer frame 81 and the rotary member 83 and deforms, and the contact area of the rubber rod 84 increases. Therefore, the rotation urging unit 80 gives the handle portion 10 the urging power by which the handle portion 10 is rotated so that one end 10A of the handle portion 10 separates from the motion converting housing 31 in the direction of the handle portion 10. Hereby, to the second elastic support member 52, force in the direction of the rear end is applied, and the cylindrical portion 52B is located on the most rear end side in the second groove 51b.

Figure 7:
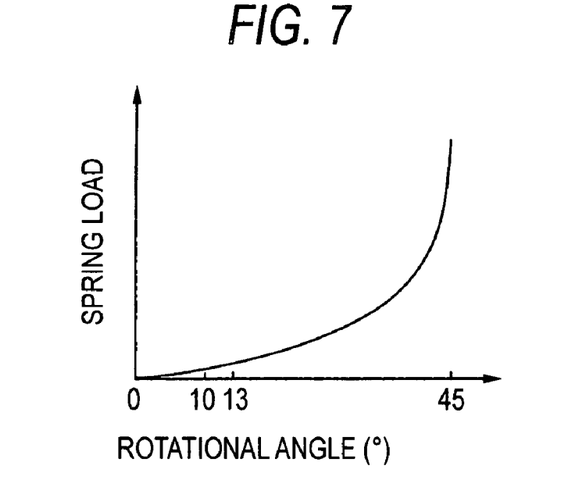
FIG. 7 is a diagram showing a relation between a rotary angle of the rotary member in the first embodiment in which the power tool of the invention is applied to the hammer tool and spring constant of the rotation urging unit.

Since the rubber rod 84 receives the rolling friction between the outer frame 81 and the rotary member 83 (the contact area of the rubber rod 84 increases), the rotation urging unit 80 exhibits non-linear torque/displacement angle characteristics, and has viscous damping capacity. The rotation urging unit 80 has, in the state shown in FIG. 3, spring constant corresponding to a rotation angle 10° in a curve N of FIG. 7 which shows a relation between a rotational angle of the rotary angle 83 and spring constant of the rotation urging unit 80. As shown in FIG. 7, when the rotary member 83 is in the state shown in FIG. 3 (state where the rotary member 83 rotates at 10°), spring load is small. Therefore, the force by which the rotation urging unit 80 rotates the handle portion 10 (force by which the rotation urging unit 80 tries to return to the initial state) is small. Accordingly, since the rotation urging unit 80 is provided at the other end 10B which is apart from the one end 10A, it can apply the very small load to the one end 10A.

As shown in FIG. 2, the motor housing 20 is provided at the lower portion on the leading end side of the handle portion 10. The electric motor 21 is accommodated in the motor housing 20. The electric motor 21 includes an output shaft 22 for outputting its rotational drive force. At the leading end of the output shaft 22, a pinion gear 23 is provided, which is located in the gear housing 30.

The gear housing 30 includes the motion converting housing 31 and a striking housing 32. The motion converting housing 31 is located at the upper portion of the motor housing 20. The striking housing 32 is located on the leading end side of the motion converting housing 31.

In the motion converting housing 31, a crank shaft 34 extending in parallel to the output shaft 22 is rotatably supported on a rear end side of the pinion gear 23. To the lower end of the crank shaft 34, a first gear 35 engaging with the pinion gear 23 is fixed coaxially. At the upper end portion of the crank shaft 34, a motion converting mechanism 36 is provided. The motion converting mechanism 36 includes a crank weight 37, a crank pin 38, and a connecting rod 39. The crank weight 37 is fixed to the upper end of the crank shaft 34. The crank pin 38 is fixed to the end portion of the crank weight 37. To the rear end of the connecting rod 39, the crank pin 38 is inserted.

In the striking housing 32, there is provided a cylinder 40 extending in a direction orthogonal to the output shaft 22. A center axis of the cylinder 40 and the rotational axis of the output shaft 22 are located on the same plane. Further, the rear end portion of the cylinder 40 is opposite to the electric motor 21. On the leading end side of the cylinder 40, a tool holder 15 is provided, and a tip tool 16 (FIG. 1) is attached removably to the tool holder 15. Further, at the inner periphery of the cylinder 40, a piston 43 is provided slidably. The piston 43 has a piton pin 43A, and the piston pin 43A is inserted to the leading end of the connecting rod 39. On the leading end side in the cylinder 40, a striker 44 is provided slidably at the inner periphery of the cylinder 40. In the cylinder 40 and between the piston 43 and the striker 44, an air chamber 45 is defined. Further, on the leading end side of the striker 44, an intermediate member 46 is provided slidably in a front and back direction in the cylinder 40.

In the motion converting housing 31 and in a portion opposite to the handle portion 10, a counter weight mechanism 70 is arranged. The counter weight mechanism 70 includes two weight holder supporting portions 71, 72, a weight holder 73, and a counter weight 74. The weight holder supporting portions 71, 72 are arranged so as to interpose the counter weight 74 between them in a direction orthogonal direction to the direction of the reciprocating motion of the piston 43. Each of the weight holder supporting portions 71, 72 has a first weight holder supporting portion 75, 76, and a second weight holder supporting portion 77, 78 located closer to the counter weight 74 side than the first weight holder supporting portion 75, 76.

Figure 8:
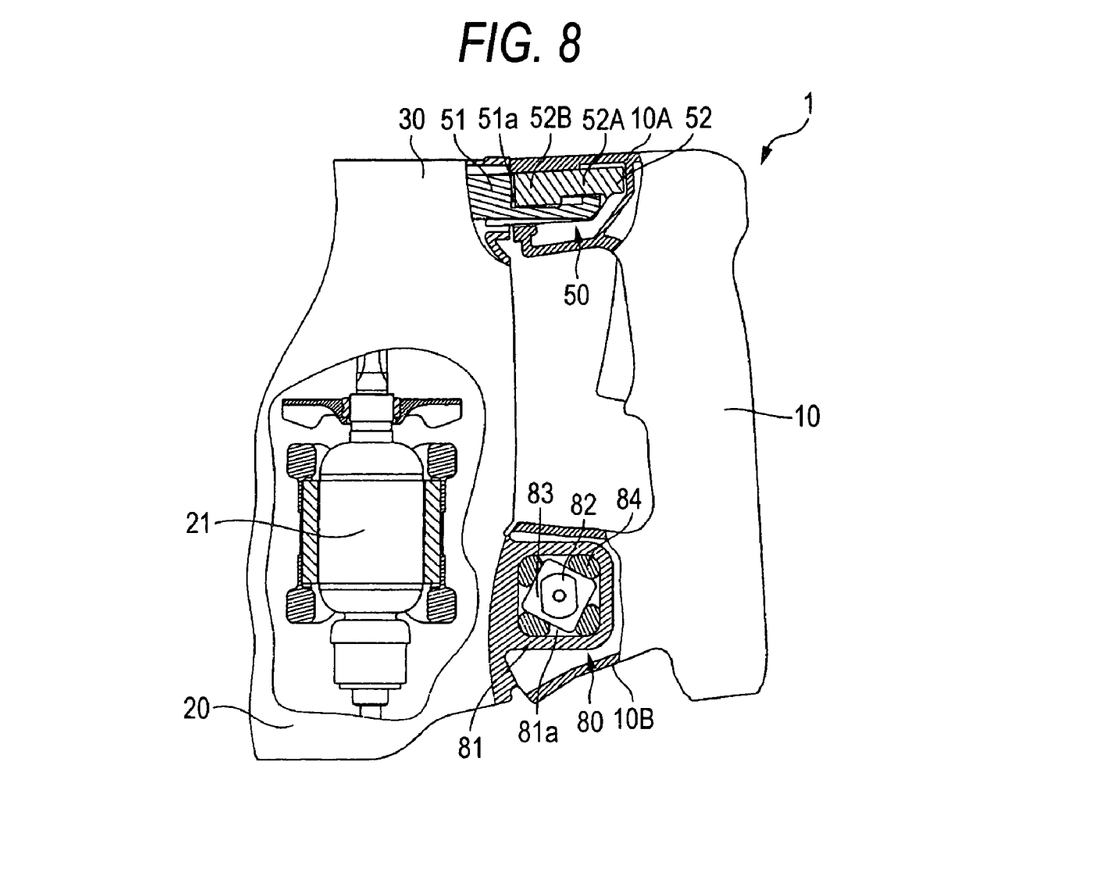
FIG. 8 is a partially sectional view of the back side of the tool body and the handle portion in an operating state of the hammer tool shown in FIG. 2.

Next, the operation of the hammer tool 1 according to the first embodiment will be described. In a state where the handle portion 10 is gripped with user's hand, the tip tool 16 is pressed against a not-shown work material. Next, the trigger 12 is pulled to supply electric power to the electric motor 21, and the electric motor is rotationally driven. This rotational drive force is transmitted through the pinion gear 23 and the first gear 35 to the crank shaft 34. The rotation of the crank shaft 34 is converted by the motion converting mechanism 36 (crank weight 37, crank pin 38, and connecting rod 39) into the reciprocating motion of the piston 43 in the cylinder 40. By the reciprocating motion of the piston 43, air pressure in the air chamber 45 increases and decreases repeatedly, whereby striking force is applied to the striker 44. The striker 44 advances and strikes against the rear end of the intermediate member 46, and the striking force is transmitted through the intermediate member 46 to the tip tool 16. By this striking force transmitted to the tip tool 16, the work material is fractured. Further, FIG. 8 shows a state where the hammer tool 1 is pressed strongly against the work material (a state where the rotary member 83 has rotated at 130).

When the above hammer tool 1 operates, vibration at a nearly constant cycle, which is caused by the reciprocating motion of the striker 44, is produced in the tool body 60. Since the rubber rod 84 is provided between the outer frame 81 fixed to the motor housing 20 and the rotary member 83 fixed to the other end 10A, and the elastic body 53 is provided between the first elastic support member 51 fixed to the motion converting housing 31 and the second elastic support member 52 fixed to the one end 10A, the rubber rod 84 (rotation urging unit 80) and the elastic body 53 (elastic unit 50) can damp the vibration generated in the tool body 60. Therefore, it is possible to restrain transmission of the vibration generated in the tool body 60 to the handle portion 10, and to improve workability of the power tool 1.

Further, the rotation urging unit 80 gives the handle portion 10 the urging power by which the handle portion 10 is rotated so that its one end 10A is spaced away from the motion converting housing 31 in the direction of the handle portion 10, whereby the force in the direction of the rear end is applied to the second elastic support member 52, and the cylindrical portion 52B is located on the most rear end side in the second groove 51b (spacing of the handle portion 10 at a given interval and more away from the motion converting housing 31 is restricted). Further, since the rotation urging unit 80 applies a very weak load to the one end 10A, without needlessly increasing the load to be applied to the elastic unit 50 in non-operation, the cylindrical portion 52B can be always located on the most rear end side in the second groove 51b, so that backlash of the handle portion 10 can be restricted.

Further, since the load applied to the elastic unit by the rotation urging unit 80 in the initial state is very small, and the elastic unit 50 is the transatory unit having the non-linear characteristics, spring load of the elastic body 53 in initial striking operation of the hammer tool 1 can be reduced. Therefore, in addition to damping, by the elastic body 53, of the vibration in a high vibration area generated in the tool body 60, vibration of the tool body 60 in a low vibration area can be efficiently absorbed. Accordingly, the elastic unit 50 can be effectively utilized in order to damp the vibration between the low vibration area and the high vibration area, so that workability of the hammer tool 1 can be improved.

Further, since the spring load of the rubber rod 84 in the initial state is small as shown in FIG. 7, the vibration in the low vibration area in the initial striking operation, which is generated in the tool body 60, can be damped effectively by the rubber rod 84, so that workability of the hammer tool 1 can be improved. Since the rotation urging unit 80 is provided so as to cover a center of the rotation of the handle portion 10, giving of the urging power to the handle portion 10, and damping of the vibration generated in the tool body 60 can be carried out at one place. Further, since the rubber rod 84 of the rotation urging unit 80 is difficult to receive deformation in its diametric direction, it is possible to restrict fluctuation of the handle portion 10 around a line segment connecting the one end of the handle portion 10A and the other end 10B thereof.

Further, the vibration generated in the tool body 60 is transmitted through the motion converting housing 31 to the weight holder support portions 71 and 72. The vibration transmitted to the weight holder support portions 71 and 72 is transmitted to the weight support member 73 and the counter weight 74, and the counter weight 74 vibrates in the same direction as the reciprocating direction of the piston 43. By this vibration of the counter weight 74, the vibration of the hammer tool 1 due to striking is reduced.

Next, a hammer tool 101 in a second embodiment in which the power tool of the invention is applied to a hammer tool will be described with reference to FIGS. 9 to 11. The same members as those in the first embodiment are denoted by the same reference numerals, explanation thereof will be omitted here, and only different portions will be described.

Figure 9:
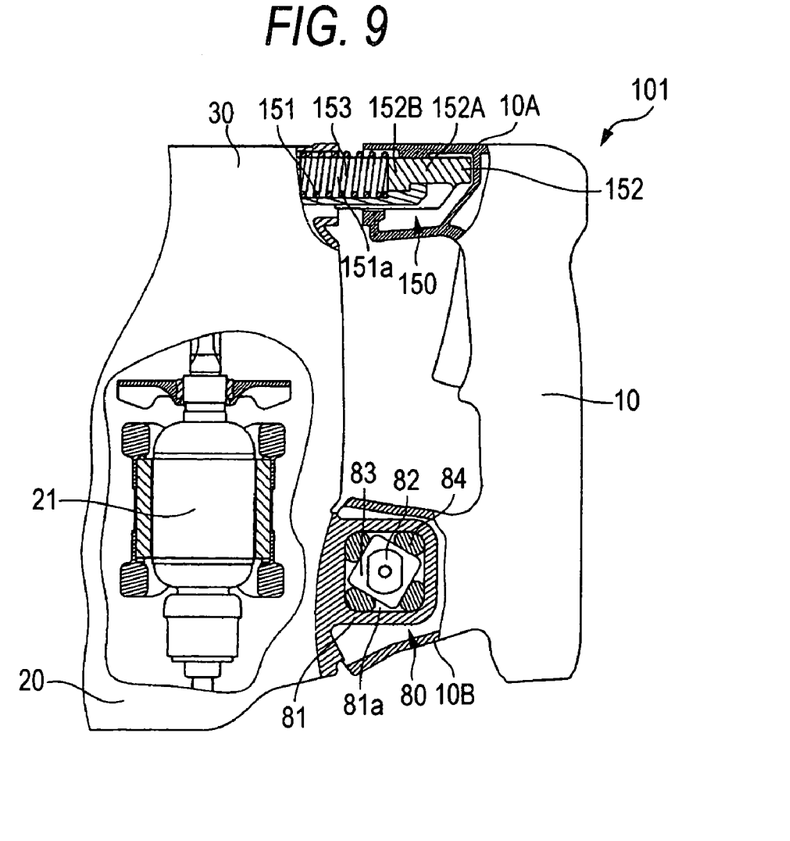
FIG. 9 is a partially sectional view of a back side of a tool body and a handle portion in an non-operation state in a second embodiment in which the power tool of the invention is applied to the hammer tool.
Figure 10:
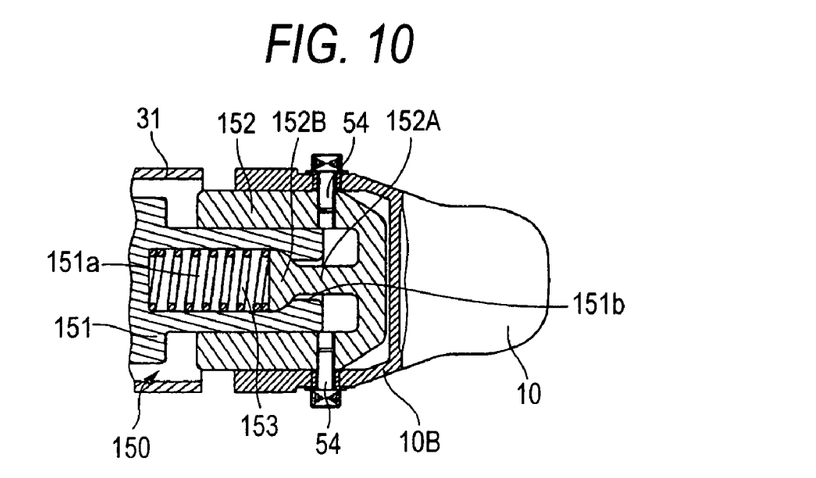
FIG. 10 is a sectional view of an elastic unit of the hammer tool shown in FIG. 9.
Figure 11:
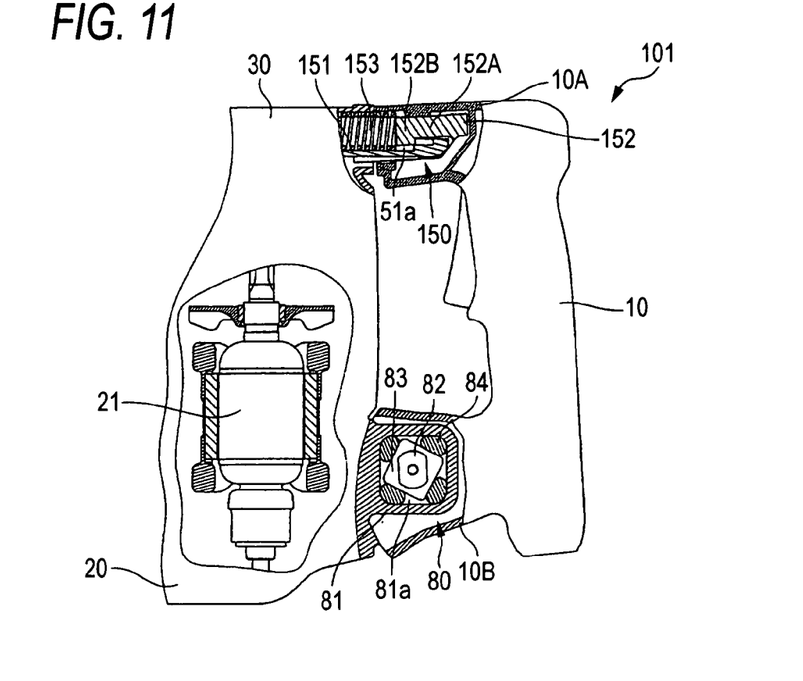
FIG. 11 is a partially sectional view of the back side of the tool body and the handle portion in an operating state in the second embodiment in which the power tool of the invention is applied to the hammer tool.

As shown in FIGS. 9 and 10, an elastic unit 150 is composed of a first elastic support member 151, a second elastic support member 152, and an elastic body 153 that is a coil spring. The first elastic support member 151 is fixed to a motion converting housing 31, and forms a first groove 151a and a second groove 151b communicating with the first groove 151a. The first groove 151a is formed so as to extend in the front and back direction. The second groove 151b is located at the back of the first groove 151a, has a width narrower than the width of the first groove 151a, and opens backward of the first elastic support member 151.

The second elastic support member 152 is fixed to one end 10A of a handle portion 10 through bolts 54. The second elastic support member 152 is provided with a bar portion 152A and a semi-cylindrical portion 152B. The bar portion 152A extends from the back portion of the second elastic support member 152 forward and passes through the second groove 151b. The semi-cylindrical portion 152B is provided at the leading end of the bar portion 152A, has a width larger than the width of the second groove 151b, and is retained in the first groove 151a slidably in relation to the first elastic support member 151. Accordingly, the one end 10A can come close to and separate from the motion converting housing 31. Further, the width of the semi-cylindrical potion 152B is larger than the width of the second groove 151b, which makes it possible to prevent the semi-cylindrical portion 152B from coming out from the first groove 151a and the second groove 151b, and makes it possible to restrict spacing of the handle portion 10 at a given interval and more away from the housing 31. The elastic body 153 is arranged in the first groove 151a, and provided between the first elastic support member 151 and the semi-cylindrical portion 152B. Further, FIG. 11 shows a state where the hammer tool 101 is pressed strongly against a work material (operating state).

Also in this embodiment, by the rotation urging unit 80, the semi-cylindrical portion 152B, the first groove 151a and the second groove 151b, backlash of the handle portion 10 in non-operation can be restricted. Further, since the urging power of the elastic body in non-operation can be made unnecessary or small, spring constant of the elastic body 153 can be made small. Therefore, vibration in a low vibration area in the initial striking operation, which is produced in the tool body 60, can be effectively damped by the elastic body 153, so that workability of the hammer tool 101 can be improved. Further, other advantages of the hammer tool 101 are similar to those of the hammer tool 1 in the first embodiment.

Next, a hammer tool 201 in a third embodiment in which the power tool of the invention is applied to a hammer tool will be described with reference to FIGS. 12 to 14. The same members as those in the first embodiment are denoted by the same reference numerals, explanation thereof will be omitted here, and only different portions will be described.

Figure 12:
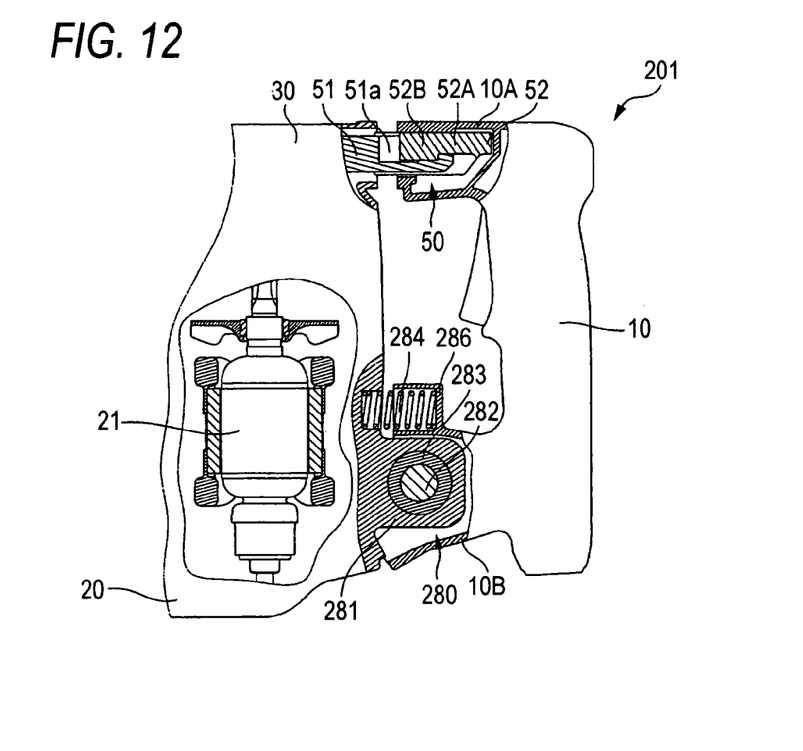
FIG. 12 is a partially sectional view of a back side of a tool body and a handle portion in an non-operation state in a third embodiment in which the power tool of the invention is applied to the hammer tool.
Figure 13:
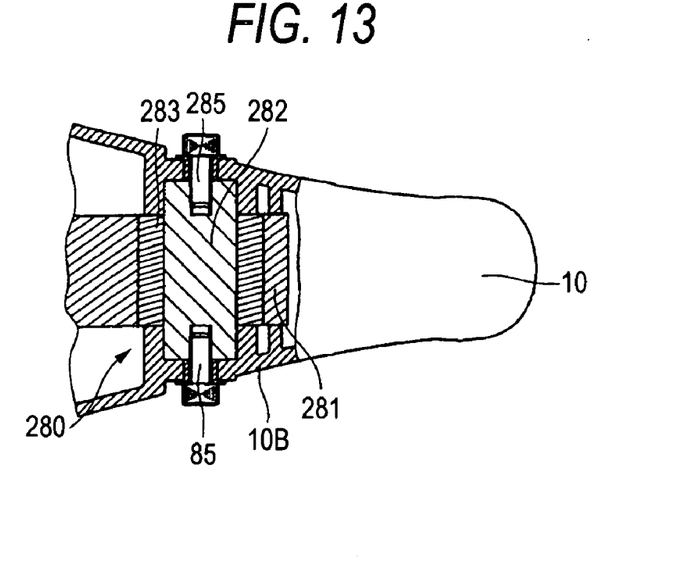
FIG. 13 is a sectional view of a rotation urging unit shown in FIG. 12.
Figure 14:
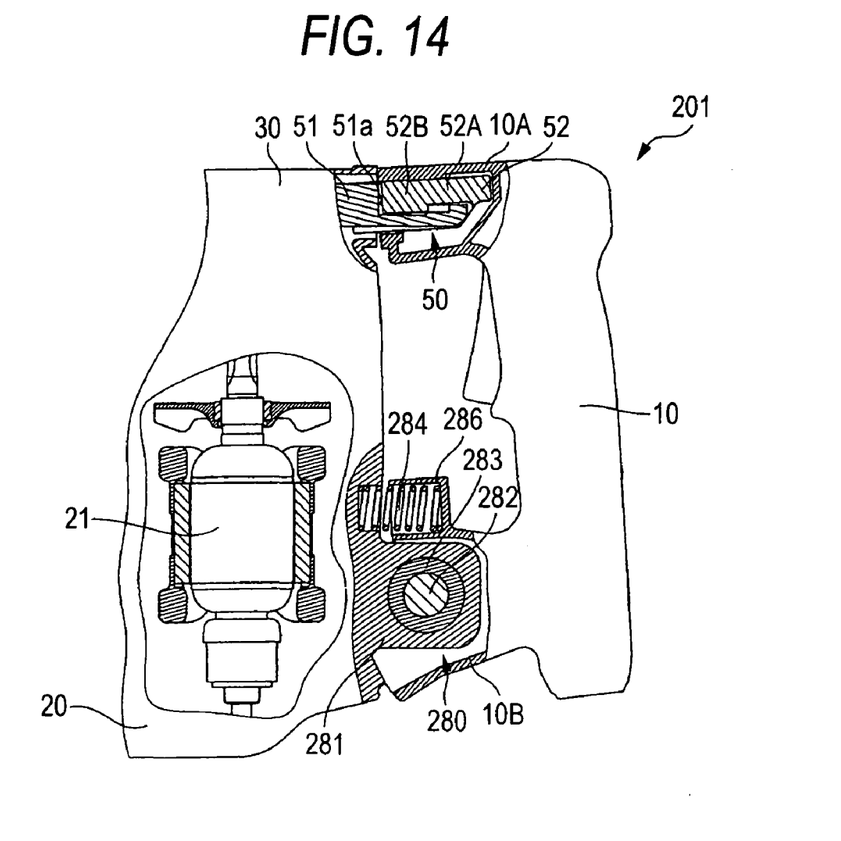
FIG. 14 is a partially sectional view of the back side of the tool body and the handle portion in an operating state in the third embodiment in which the power tool of the invention is applied to the hammer tool.

As shown in FIGS. 12 and 13, a rotation urging unit 280 is composed of an outer frame 281, a shaft 282, a cylindrical rubber 283, a coil spring 284, and a spring receptor 286. The outer frame 281 defines inner space having a circular section, and fixed to a motor housing 20. The shaft 282 passes through the inner space of the outer frame 281 and is fixed to the other end 10B of a handle portion 10 by bolts 85. The handle portion 10 is provided rotatably around the shaft 282. The cylindrical rubber 283 is arranged, in the inner space of the outer frame 281, at the periphery of the shaft 282. The spring receptor 286 is provided on the upside of the other end 10B. The coil spring 284 is provided between the motor housing 20 and the spring receptor 286. Further, FIG. 14 shows a state where the hammer tool 201 is pressed strongly against a work material (operating state).

The coil spring 284 is constructed so as to always give the handle portion 10 urging force by which the handle portion 10 is rotated so that one end 10A of the handle portion 10 is spaced from a motion converting housing 31 in the direction of the handle portion 10. Therefore, also in this embodiment, the initial load to be applied to an elastic unit 50 in the initial state can be reduced, and the vibration in the low vibration state can be efficiently absorbed. Further, by the rotation urging unit 280, the cylindrical portion 52B, the first groove 51a and the second groove 51b, backlash of the handle portion 10 in non-operation can be restricted. Further, by the cylindrical rubber 283 and the coil spring 284, the vibration in the low vibration area in initial striking operation, which is produced in the tool body 60, can be effectively damped, so that workability of the hammer tool 201 can be improved. Further, other advantages of the hammer tool 201 are similar to those of the hammer tool 1 in the first embodiment.

Next, a hammer tool 301 in a fourth embodiment in which the power tool of the invention is applied to a hammer tool will be described with reference to FIGS. 15 to 17. The same members as those in the third embodiment are denoted by the same reference numerals, explanation thereof will be omitted here, and only different portions will be described.

Figure 15:
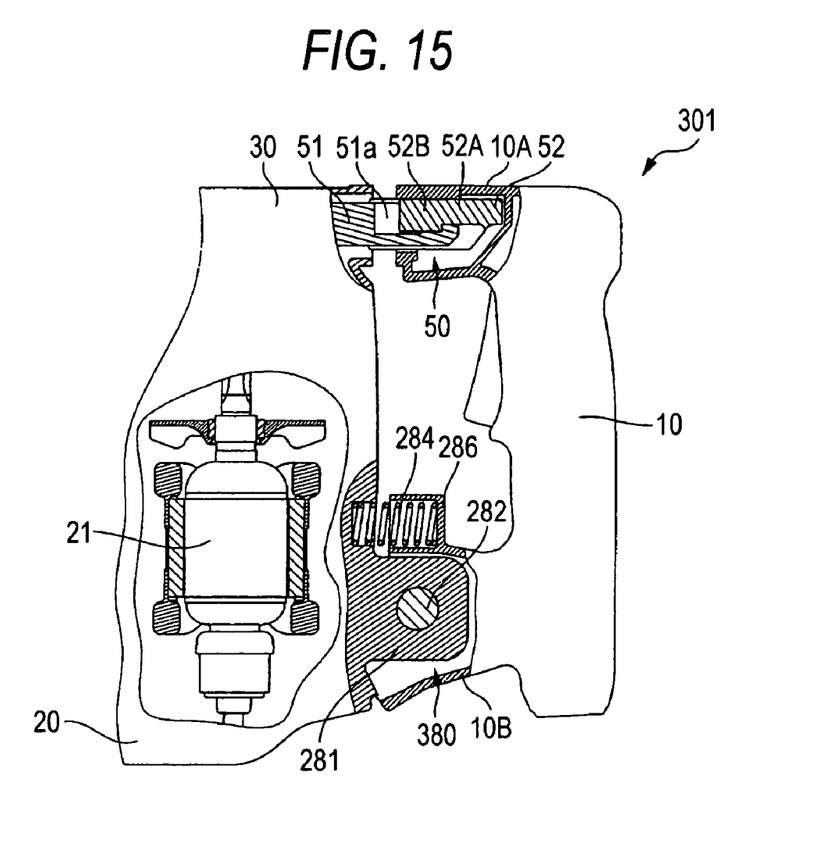
FIG. 15 is a partially sectional view of a back side of a tool body and a handle portion in an non-operation state in a fourth embodiment in which the power tool of the invention is applied to the hammer tool.
Figure 16:
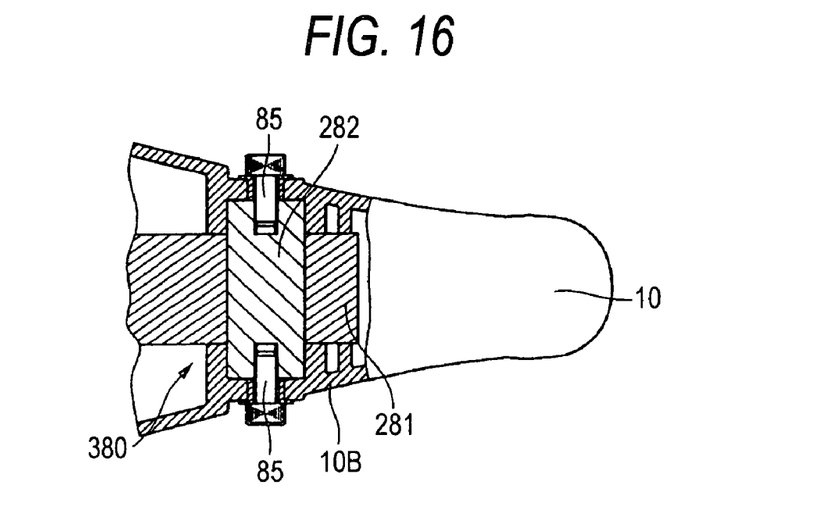
FIG. 16 is a sectional view of a rotation urging unit shown in FIG. 15.
Figure 17:
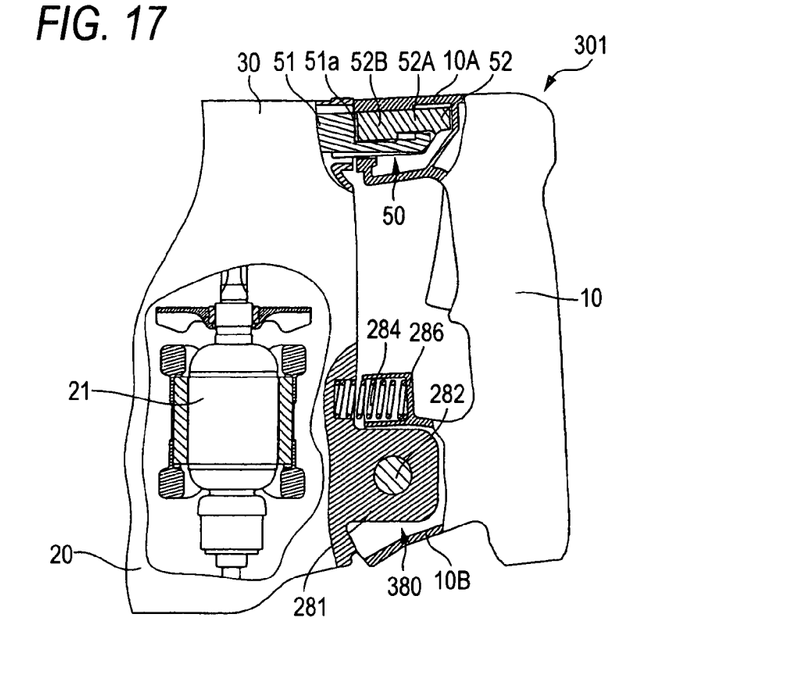
FIG. 17 is a partially sectional view of the back side of the tool body and the handle portion in an operating state in the fourth embodiment in which the power tool of the invention is applied to the hammer tool.

As shown in FIGS. 15 and 16, a rotation urging unit 380 of the hammer tool 301 has structure in which the rotation urging unit 280 in the third embodiment does not include the cylindrical rubber 283. Other constitutions of the hammer tool 301 are similar to those of the hammer tool 201 in the third embodiment. Therefore, also in this embodiment, the initial load to be applied to an elastic unit 50 in the initial state can be reduced, and the vibration in the low vibration area can be efficiently absorbed. Further, by the rotation urging unit 380, the cylindrical portion 52B, the first groove 51a and the second groove 51b, backlash of the handle portion 10 in non-operation can be restricted. Further, other advantages of the hammer tool 301 are similar to those of the hammer tool 201 in the third embodiment.

Figure 18:
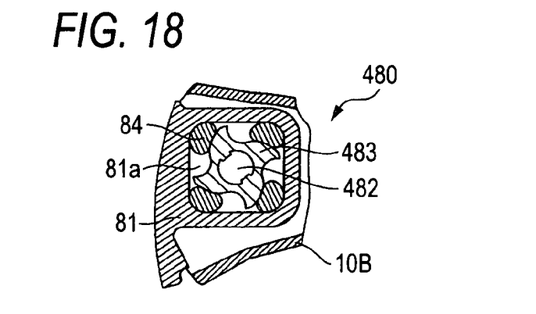
FIG. 18 is a diagram showing a modified exampled of the rotation urging unit.
Figure 19:
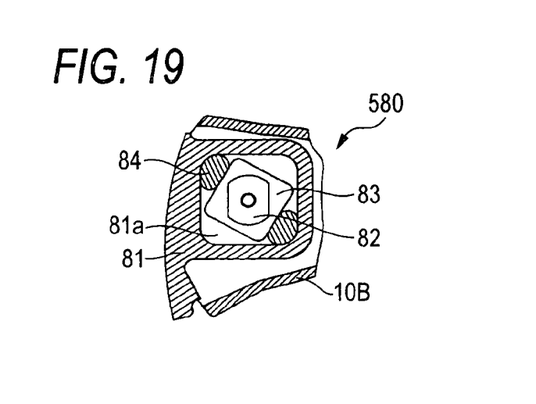
FIG. 19 is a diagram showing another modified exampled of the rotation urging unit.
Figure 20:
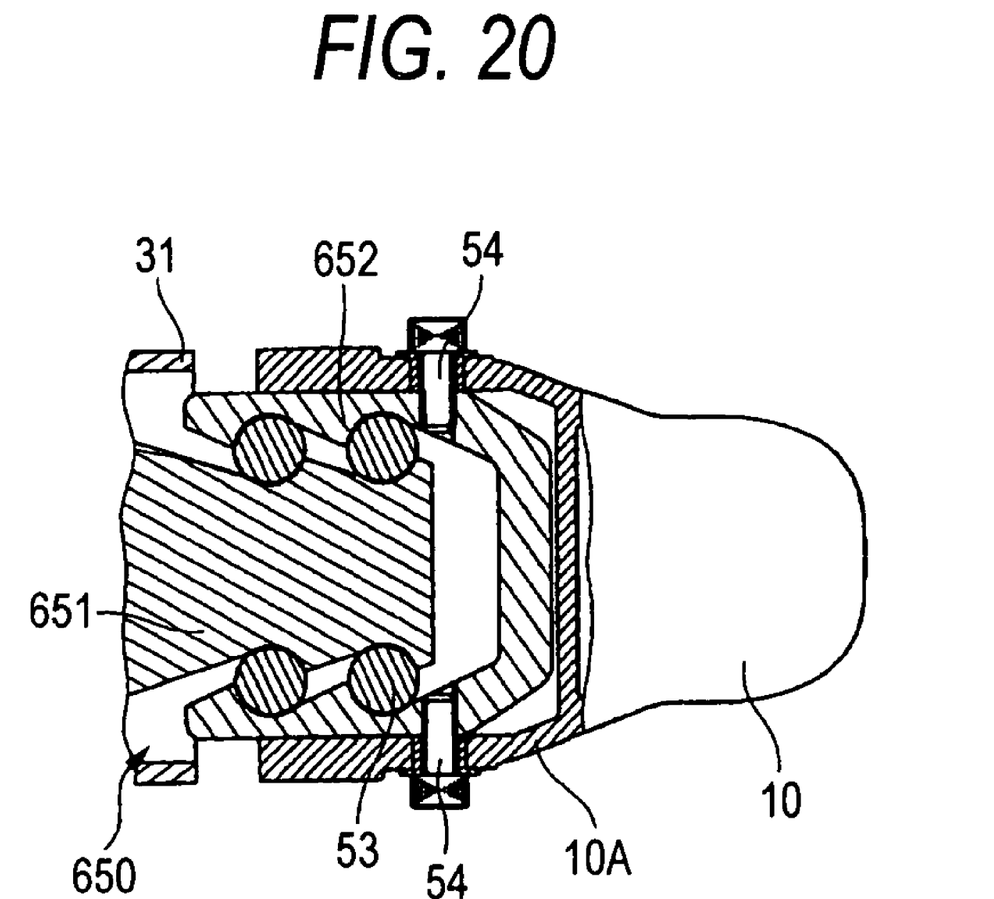
FIG. 20 is a diagram showing a modified exampled of the elastic unit.

The hammer tool of the invention is not limited to the above embodiments, but various modifications and improvements are possible within the scope of the accompanying claims. For example, although the rotation urging unit 80 in the first and second embodiments is the Neidhart as shown in FIG. 3, it may be an involute type Neidhart rotation urging unit 480 which includes a shaft 482 and a rotary member 483 as shown in FIG. 18, or a rotation urging unit 580 including two rubber rods 84 as shown in FIG. 19. Further, the elastic unit 50 in the first, third and fourth embodiments may be an elastic unit 650 shown in FIG. 20 in which a first groove and a second groove are not formed in a first elastic support member 651, and a bar portion 52A and a cylindrical portion 52B are not provided for the second elastic support member 652. Further, the hammer tool of the invention may be a hammer tool in which the elastic unit 150 in the second embodiment is provided for one end 10A of the handle portion 10, and the rotation urging unit 280 in the third embodiment is provided for the other end 20B thereof.

What is claimed is:
1. A power tool comprising:
a housing;
a motor accommodated in the housing;
a reciprocation converting part converting a rotation of the motor into reciprocating motion;
a tip tool attached to a leading end side of the housing, the tip tool being driven by the reciprocating motion of the reciprocation converting part;
a handle portion having one end connected to a back portion of the housing that accommodates the reciprocation converting part and the other end connected to another back portion of the housing which is different from the back portion of the housing which accommodates the reciprocation converting part;

an elastic means provided between the back portion of the housing and the one end of the handle portion; and rotation urging means provided between the another back portion of the housing and the other end of the handle portion, thereby being positioned away from the back portion of the housing which accommodates the reciprocation converting part, wherein the rotation urging means includes:
an outer frame which defines inner space;
a shaft passing through the inner space and around which the handle portion is rotated;
a rotary member fixed, in the inner space, to the shaft and rotatable together with the shaft; and
plural elastic bodies provided in the inner space between the outer frame and the rotary member;

wherein the rotation urging means gives the one end of the handle portion urging power by which the handle portion is rotated around the other end of the handle portion so that the one end of the handle portion is spaced away from the back portion of the housing in a direction of the handle portion.

2. The power tool according to claim 1, wherein the rotation urging means is a Neidhart spring.

3. The power tool according to claim 1, wherein the rotation urging means gives urging power to the one end of the handle portion by rolling friction of the plural elastic bodies.

4. The power tool according to claim 1, wherein the reciprocation converting part includes:
a cylinder;
a piston slidably provided at the inner periphery of the cylinder;
a motion converting part converting a rotational drive force of the electric motor into reciprocating motion of the piston; and
a striker driven by the reciprocating motion of the piston.

5. The power tool according to claim 1, comprising:
stopper means provided between the back portion of the housing and the one end of the handle portion, and
wherein the stopper means restricts spacing of the one end of the handle portion at a given interval from the back portion of the housing which accommodates the reciprocation converting part.

6. The power tool according to claim 1, wherein the rotation urging means has non-linear characteristics.

7. The power tool according to claim 1, wherein the rotation urging means is arranged around a center of the rotation of the handle portion.

* * * * *